No. 834,146. PATENTED OCT. 23, 1906.
H. B. LEWIS.
AUTOMOBILE TRUCK.
APPLICATION FILED OCT. 23, 1905.
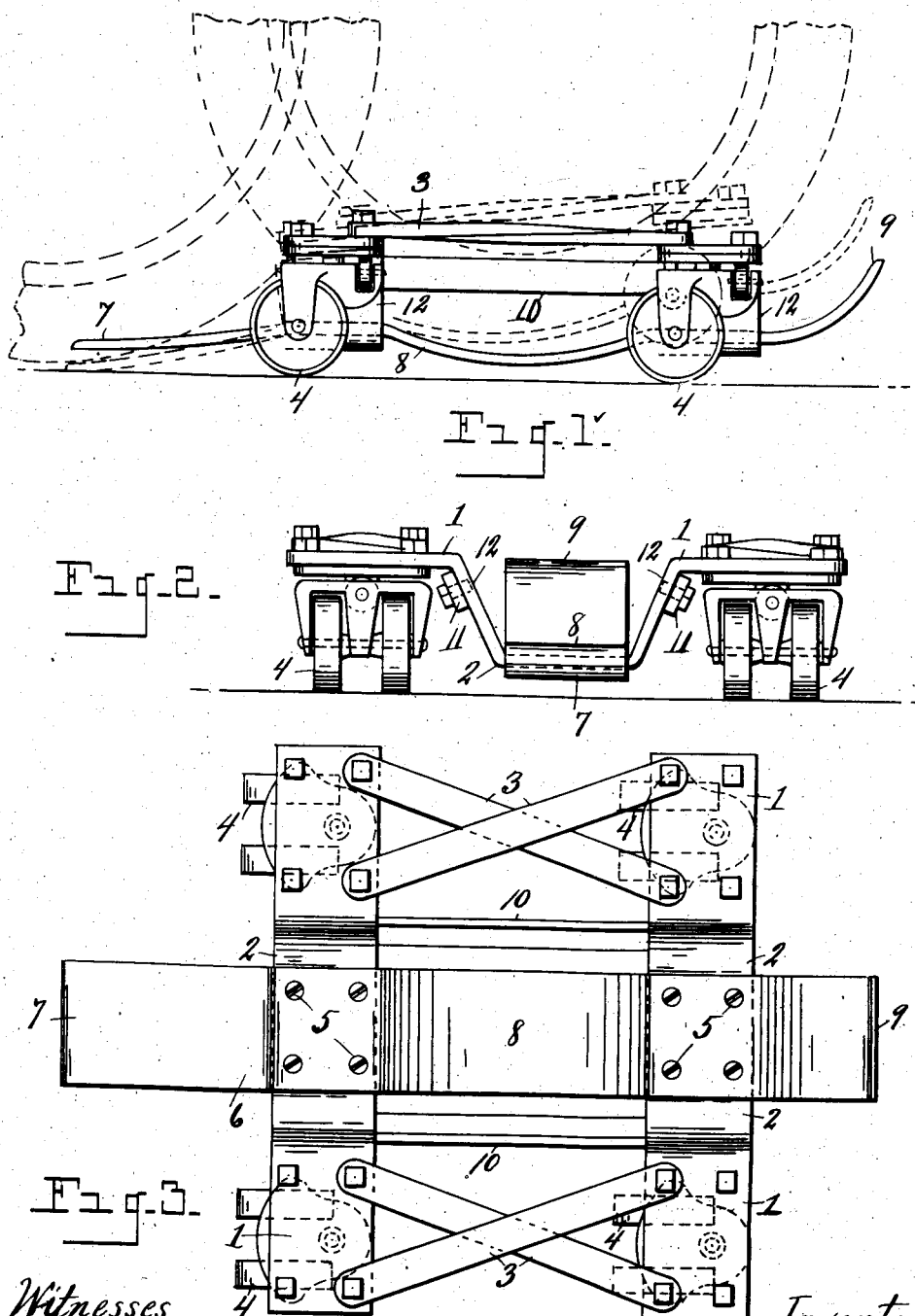

UNITED STATES PATENT OFFICE.

HENRY B. LEWIS, OF DETROIT, MICHIGAN.

AUTOMOBILE-TRUCK.

No. 834,146.　　　　Specification of Letters Patent.　　　Patented Oct. 23, 1906.

Application filed October 23, 1905. Serial No. 283,820.

*To all whom it may concern:*

Be it known that I, HENRY B. LEWIS, a citizen of the United States, residing at Detroit, in the county of Wayne, State of Michigan, have invented certain new and useful Improvements in Automobile-Trucks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to trucks for moving automobiles; and it consists in the construction and arrangement of parts hereinafter fully set forth, and pointed out particularly in the claims.

The object of the invention is to provide simple and efficient means of strong and economical construction to enable the rear ends of automobiles to be moved or swung laterally to facilitate the handling thereof in a garage, the arrangement being such as to enable the wheels of the automobile to be readily run onto the trucks and securely maintained in position thereon while the trucks are being manipulated. The above object is attained by the structure illustrated in the accompanying drawings, in which—

Figure 1 is a view of my improved truck, showing by dotted lines the position of parts as the wheel is rolling onto the truck and also the position of the wheel thereon. Fig. 2 is a front elevation of the truck. Fig. 3 is a plan view thereof.

Referring to the characters of reference, 1 designates the opposed approximately parallel bars which form the main portion of the truck-frame and which are centrally depressed, as shown at 2, so that the end portions of said bars are elevated some distance above said central portions. Connecting the opposite ends of the bars 2 are the diagonal truss-rods 3, whose outer ends are bolted to said bars or otherwise rigidly secured thereto. The bars 1 and truss-rods 3 when joined or connected as described form a rectangular truck-frame the four corners of which stand above the plane of the central supporting portion. Swiveled to the under face of the elevated corners are the casters 4, which support the frame so that the depressed central portions 2 of the bars 1 will be raised free from the floor or surface upon which the casters rest. Crossing the depressed portions of the bars 2 and secured thereto by the screw-bolts 5 is a supporting-plate 6. The forward end 7 of said plate projects in front of the truck-frame and is curved slightly downwardly. The central portion of said plate between the bars 1 is concaved, as at 8, and the rear portion thereof, which extends in the rear of the truck-frame, is curved upwardly, as at 9. In employing these improved trucks they are so positioned as to enable the rear wheels of an automobile to be rolled onto the forwardly-projecting ends 7 of the plates 6. As the wheels roll onto said plates they tip downwardly, thereby raising the rear ends of the truck, as shown by dotted lines in Fig. 1, causing the forward ends 7 of said plates to bear upon the floor, thereby preventing the trucks skidding from under the wheels as they roll thereon. Because of the central depressions in the truck-frames in which the supporting-plates lie said plates are held but a slight distance above the surface, so that the wheels of the car may be rolled thereon with but little difficulty. The central depressions 8 of the supporting-plates receive the arcs of the wheels and maintain the trucks in proper position thereunder. The raised rear portions 9 of the supporting-plates prevent the wheels running off of the back of the trucks.

In order to direct the wheels squarely onto the trucks and to obviate their running off of the central portion of the supporting-plates 8 at an angle, the guard-rails 10 are employed, which are bolted at their opposite ends, as shown at 11, to the inclined portions 12 of the bars 1 and extend between said bars parallel with said supporting-plate.

A truck constructed as herein described of quadrangular shape, supported at the four corners upon casters, will not tip as the wheel is rolled thereon, nor in the movement thereof when carrying its load, the weight being so distributed as to bring the bearing equally upon all of the casters.

Having thus fully set forth my invention, what I claim as new, and desire to secure by Letters Patent, is—

1. A truck, comprising a rectangular frame, having casters under the four corners thereof, and having the transverse bars with the depressed central portions, means for joining said bars at their ends, a supporting-plate mounted upon and crossing the depressed central portions of said bars, said plate having a forwardly-projecting downwardly-curved front end, a concaved central portion, and an upwardly-turned rear end extending beyond the frame of the truck.

2. A truck, comprising a quadrangular frame composed of transverse bars having depressed central portions, casters under the ends of said bars, diagonal rods joining the ends of said bars to maintain them approximately parallel, guard-rails crossing between said bars at the sides of said depressed portions, a supporting-plate mounted upon and crossing the depressed portions of said bars, said plate having a forwardly-projecting and downwardly-curved front end, a concaved portion lying between the transverse bars of the frame, and an upwardly-projecting curved rear end.

3. A truck, comprising a quadrangular frame, transverse bars forming the front and rear of the frame having depressed central portions, diagonal brace-rods joining the ends of said bars, casters supporting the quadrangular frame at the corners, a supporting-plate mounted upon and crossing the depressed portion of said bars, said plate being concaved between said bars substantially as set forth.

4. A truck, comprising a quadrangular frame, transverse bars forming the front and rear of the frame having depressed central portions, casters supporting the quadrangular frame at the corners, a supporting-plate mounted upon and crossing the depressed portion of said bars, guard-rails connecting the inclined portions of said transverse bars and lying parallel with said supporting-plate, said plate being concaved between said bars substantially as set forth.

In testimony whereof I sign this specification in the presence of two witnesses.

HENRY B. LEWIS.

Witnesses:
 E. S. WHEELER,
 I. G. HOWLETT.